(12) United States Patent
Kishibe et al.

(10) Patent No.: US 6,577,587 B1
(45) Date of Patent: Jun. 10, 2003

(54) TURNTABLE DEVICE AND MANUFACTURING METHOD THEREOF

(75) Inventors: Taro Kishibe, Hyogo (JP); Mikio Hirano, Osaka (JP); Shigenori Uda, Osaka (JP); Yuko Otani, Osaka (JP); Masashi Senoo, Tottori (JP); Kouji Kuyama, Tottori (JP); Shuichi Yamane, Tottori (JP); Akio Ando, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/646,358
(22) PCT Filed: Mar. 10, 1999
(86) PCT No.: PCT/JP99/01149
§ 371 (c)(1),
(2), (4) Date: Nov. 16, 2000
(87) PCT Pub. No.: WO99/46772
PCT Pub. Date: Sep. 16, 1999

(30) Foreign Application Priority Data

Mar. 13, 1998 (JP) .............................................. 10-062842
Mar. 16, 1998 (JP) .............................................. 10-065009

(51) Int. Cl.$^7$ ............................................... G11B 23/00
(52) U.S. Cl. ........................................................ 369/270
(58) Field of Search ................................. 369/270, 263, 369/264

(56) References Cited

U.S. PATENT DOCUMENTS

4,841,516 A * 6/1989 Ohmori et al. .............. 369/264
5,995,480 A * 11/1999 Naka et al. .................. 369/263

FOREIGN PATENT DOCUMENTS

| JP | 01055607 | 3/1989 |
| JP | 06290537 | 10/1994 |
| JP | 09027166 | 1/1997 |
| JP | 09190675 | 7/1997 |
| JP | 11025555 | 1/1999 |

* cited by examiner

Primary Examiner—Allen Cao
(74) Attorney, Agent, or Firm—RatnerPrestia

(57) ABSTRACT

A turntable device includes a disc base on the circumference thereof, and the disc base has a hardness more than a given level. The surface of the disc base is roughened at a given level in order to prevent the disc from slipping and adhesion to the disc base. The disc base can compensate surface wobble caused by the disc base. A manufacturing method of the turntable device includes the steps of: a) dripping liquid resin mixed with fine particles on the circumference of the turntable; and b) hardening the resin to form the disc base. The turntable device is good for e.g. CD players, optical disc driving apparatuses.

28 Claims, 7 Drawing Sheets

TURNTABLE DEVICE AND MANUFACTURING METHOD THEREOF

This application is a U.S. National phase application of PCT International Application PCT/JP99/01149.

FIELD OF THE INVENTION

The present invention relates to a turntable device for receiving a recording disc of a disc driving apparatus that spins the recording disc thereby recording and/or playing back information. The present invention relates more particularly to the turntable device mounted to disc driving apparatuses of compact disc (CD) players, digital video disc (DVD) players, optical disc drive players, and magneto-optical (MO) disc players.

BACKGROUND ART

A turntable device is employed as a disc rotator in a disc driving apparatus for recording media such as CD and MO disc. The turntable spins at a rotational speed ranging from hundreds rpm to thousands rpm. The Japanese Patent Application Non-examined Publication No. H09-190675 discloses a turntable device of which disc base is formed by photo-curable resin.

The disc base made of photo-curable resin has a mirror-finished-surface with a low friction coefficient. The disc placed on the base thus is apt to slip on the base. On the contrary, the disc adheres to the mirror-surface of the base, and a user has a difficulty when removing the disc from the disc base. In addition, a removal of the disc from the base sometimes produces noises.

The turntable device mounted on such disc driving apparatuses requires the more flatness on its base because the disc is spun at a high speed and high-density-data are read and write from/to the disc. An acceptable level of surface wobble, in general, is not more than 30 μm for DVD player, 20 μm for DVD-ROM apparatus, and 10 μm for DVD-RAM apparatus. However, because the market tendency required the disc be rotated at the higher speeds and be equipped with the higher density, the acceptable level of the surface-wobble should be more strictly controlled. Wobble of base during the operation naturally causes the disc loaded on the base to wobble. The disc wobble changes a distance between the disc and a head disposed closely to the disc so that the head could not read/write data to/from the disc correctly.

Several factors contribute to this surface wobble: accuracy of mounting a turntable to a rotary shaft of a motor that drives the turntable, accuracy of machining each component of the motor, and accuracy of assembling these components into the motor are the main factors. The surface wobble due to the motor rotation thus varies according to each turntable device and is not the same. In order to minimize this surface wobble, the machining accuracy of the motor components and the assembling accuracy thereof have been improved; however, this method of improving the accuracy has dead-locked for realizing the further flatness of the base.

Another prior art of the turntable device is disclosed by the Japanese Patent Application non-examined Publication No. H11-25555. In this prior art, a turntable made of resin is secured to a metallic rotor housing of a motor. The turntable is coated with paint comprising polyester resin in suitable quantity, and the coated material is hardened. Then the surface of the coated material is cut and processed.

When the turntable made of resin is coated with paint comprising polyester resin, mold release agent used for forming the turntable still remains on the turntable. The agent thus repels the resin sprayed for coating the turntable so that the resin cannot coat uniformly the turntable.

Other conventional turntables employ polycarbonate that is vulnerable to solvent. The turntable is therefore susceptible to being damaged when the resin including solvent is applied thereto. Turntables made of resin having a low heat-resistance, e.g. polycarbonate, hardly accept an application of resin that requires heating. When a disc base formed by resin coating is machined on the turntable made of resin, suitable adhesive strength between the turntable and base, both made of resin, cannot be expected. In other words, the turntable made of resin is oxidized while it is molded as well as it is left so that the surface of the turntable cannot keep a stable condition. The adhesive characteristics between the turntable and base thus remain unstable. As a result, the adhesive strength therebetween is weak, and the base might be come off from the turntable when the disc base is cut and processed.

DISCLOSURE OF THE INVENTION

The present invention addresses the problems discussed above, and aims to provide a turntable device of which disc base has a hardness more than a given level, and the base has a roughened surface. This construction allows a disc on the base to be free from slip thanks to appropriate friction between the base and disc during the driving, and also to be removed from the base with ease.

A manufacturing method of this turntable comprises the steps of:

(a) applying resin liquid mixed with fine particles;
(b) forming a disc base by hardening the liquid resin; and
(c) roughening a surface of the disc base.

This manufacturing process can realize a turntable device that can prevent a disc from slipping and adhesion to the disc base. Also the turntable manufactured by this method can control surface wobble within an acceptable level.

The disc base can be cut and processed while the turntable device is mounted to the disc driving apparatus so that appropriate friction is produced between a disc and the base as well as surface wobble can be accurately controlled.

Since resin is applied to a metallic turntable, adhesive strength therebetween is stronger than the case where both are made of resin. The structure of the present invention thus is good for being cut and processed.

DETAILED DESCRIPTION OF THE PREFERRED EMBODIMENTS

Exemplary embodiments of the present invention are described with reference to the accompanying drawings.
Exemplary Embodiment 1

Figure 1:
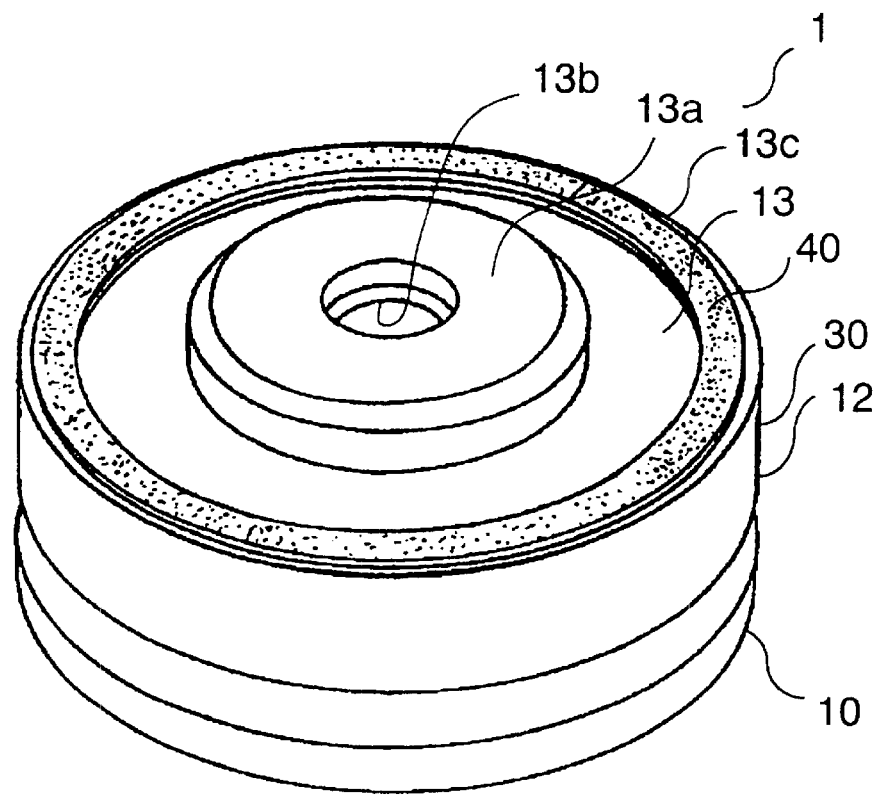
FIG. 1 is a perspective view of a turntable device in accordance with an exemplary embodiment of the present invention.
Figure 2:
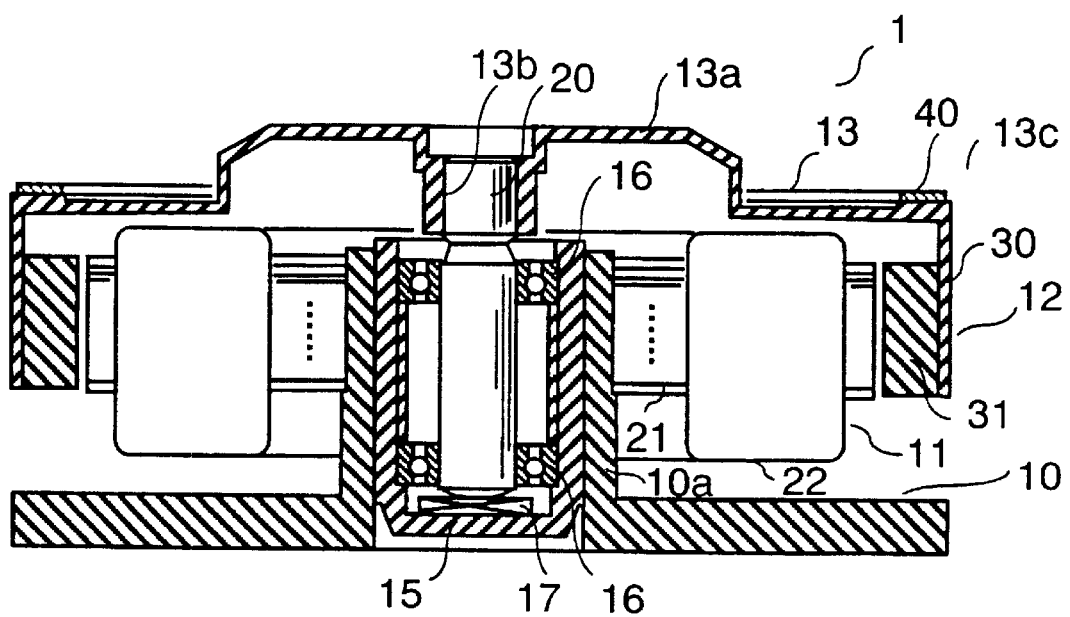
FIG. 2 is a cross section of the turntable device in accordance with the exemplary embodiment of the present invention.

The turntable device shown in FIG. 1 and FIG. 2 in accordance with the first exemplary embodiment of the present invention is, e.g. employed in an optical disc driving apparatus. Turntable device 1 is driven by a brushless DC motor that comprises (a) base bracket 10, (b) stator 11 mounted to base bracket 10, (c) rotor 12 journaled by base bracket 10. Turntable 1 has turntable 13 integrally formed with rotor 12.

Base bracket 10 is cylindrical with a stand. In an inner wall of the cylinder 10a, bearing case 15 shaped as a cylinder with a bottom is fitted in. A pair of radial bearings 16 are fitted in the inner wall of the bearing case 15, one is at upside and the other is at downside with a space in between. Rotary shaft 20 extends through the pair of radial bearings 16 and is journaled by the bearings 16. At the center of bottom of bearing case 15, thrust plate 17 is disposed. A tip of shaft 20 contacts thrust plate 17 so that shaft 20 is axially supported by thrust plate 17. The bearing can be a non-contact type bearing such as a hydrodynamic bearing.

Stator 11 includes stator core 21 fixed on an outer wall of cylinder 10a of base bracket 10, and windings 22 wound on stator core 21. Rotor 12 includes cylindrical rotor frame 30 and rotor magnet 31 fixed to rotor frame 30. Stator core 21 faces magnet 31 via an annular space, for rotor 12 rotates outside stator 11.

Turntable 13 is integrally formed with rotor frame 30 so that turntable 13 covers the upper portion of rotor frame 30. Turntable 13 is made of iron of which surface is processed by plating or depositing zinc or nickel, or ion plating. In the case of plating, chromate process may be provided on the outer most surface of the plated face.

In the embodiment discussed above, turntable 13 is directly formed on the top plate of rotor frame 30, i.e. the top plate per se functions as a turntable; however, it can be separated from the rotor frame. In this case, turntable 13 can be made of any metals easy to process such as copper, or aluminum, while rotor frame 30 is still made of iron.

In a center portion of turntable 13, a circular protrusion 13a is formed to concentrically engage with a disc loaded on a base. At the center of protrusion 13a, mounting hole 13b is provided for rotary shaft 20 to be fitted therein. On a circumference 13c of turntable 13, ring-shaped disc base 40 is formed. Disc base 40 was made of resin and has been hardened but is still elastic.

In this exemplary embodiment, disc base 40 is made of photo-curable resin, which compensates the surface wobble. The disc is prevented from slipping on disc base 40 by mixing fine particles of silica into the photo-curable resin. After the motor is assembled, disc base 40 is formed in a thickness responsive to the amount of surface wobble. The photo-curable resin used in disc base 40 is preferably, e.g. SUV-350 made by SANYU RESIN INC., which is ultraviolet curable resin having elasticity.

A procedure of manufacturing turntable 1 is described hereinafter.

First, fit bearing case 15 into cylinder 10a along the inner wall. Secure a pair of radial bearings 16 to the inner wall of bearing case 15.

Second, form stator 11 by fitting stator core 11 into cylinder 10a along the outer wall thereof. Stator core 11 has been wound with winding 22.

Third, form rotor 12 by fixing magnet 31 to rotor frame 30, and press fit rotary shaft 20 into hole 13b of center protrusion 13a on turntable 13.

Then, extend rotary shaft 20 of rotor 12 through bearing 16, and assemble stator 11 with rotor 12, thereby forming a motor.

Finally, form disc base 40 by varying film-thickness of base 40 responsive to the amount of surface wobble of the turntable.

Outline of the film-forming-device used in manufacturing disc base 40 is described with reference to FIG. 3. A manufacturing method of disc base 40 is also discussed.

Figure 3:
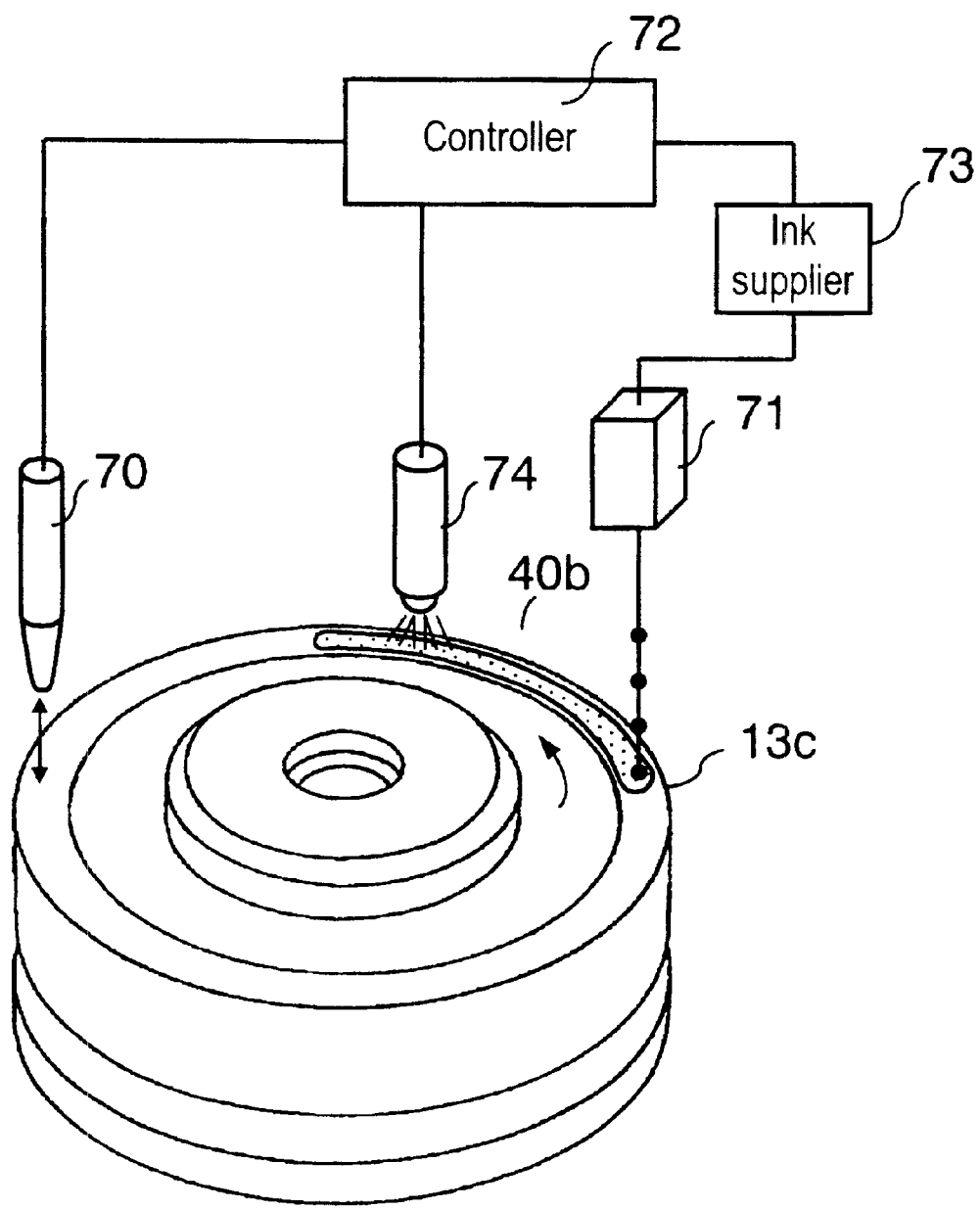
FIG. 3 illustrates a manufacturing method of a disc base of the turntable device in accordance with an exemplary embodiment of the present invention.

In FIG. 3, the film-forming-device forms a film on circumference 13c of the turntable responsive to the amount of surface wobble generated on circumference 13c.

The film-forming-device comprises (a) controller 72, (1) photo-sensor 70 for measuring amount of surface wobble, (c) inkjet nozzle 71, (d) ink supplier 73 and (e) ultraviolet lamp 74.

Photo-sensor 70 is disposed facing circumference 13c with a given distance, and measures the distance changes in between. Photo-sensor 70 is coupled to controller 72 including a microcomputer. When the turntable is spun, controller 72 acquires the measurement result by sensor 70 at given sampling intervals, and calculates amount of surface wobble at each rotational position, then determines a desirable flat plane based on the calculation result.

Controller 72 is coupled to ink supplier 73 and ultraviolet lamp 74. Ink supplier 73 is coupled to inkjet nozzle 71. Nozzle 71 is disposed e.g. at 180° rotational angle from sensor 70. Nozzle 71 drips ink made of ultraviolet curable elastic resin. Nozzle 71 can control the thickness of ink application arbitrarily. The resin-made ink is mixed with silica of which particle diameter ranges from 10 nm to 100 nm.

Ultraviolet lamp 74 is disposed at downstream side in the rotational direction with regard to nozzle 71. Lamp 74 irradiates ultraviolet ray to circumference 13c. Ink supplier 73 includes an ink-tank for reserving the ink, and a pump for dripping a given amount of ink per drip. A number of drips can be controlled so that the nozzle 71 can drip any amount of ink arbitrarily. Controller 72 provides a signal that controls a number of drips to ink supplier 73 at a given timing. The outlet of nozzle 71 measures 0.1–0.3 mm across.

The disc base of turntable device in accordance with the first exemplary embodiment of the present invention is manufactured by the following steps:

(a) Dispose the turntable device at a given place in the film-forming device, and spin the motor;

(b) Photo-sensor 70 measures the surface wobble of circumference 13c along the entire circumference of the turntable.

(c) Controller 72 calculates each amount of surface wobbles at each rotational position based on the measurement results by sensor 70.

(d) Controller 72 provides the signal that controls a number of drips to ink supplier 73 until entire circumference 13c reaches to the desirable flat plane.

(e) Ink supplier 73 supplies a given amount of ink to inkjet nozzle 71 based on the control signal.

(f) Nozzle 71 drips ink to circumference 13c until entire circumference 13c reaches the desirable flat plane so that ring-shaped film 40b is formed on circumference 13c.

(g) Ultraviolet lamp 74 irradiates ultraviolet ray to film 40b thereby hardening film 40b. Then dry the hardened film 40b so that disc base 40 is formed.

It is not necessarily to drip a required amount of ink all at one time, but the process of "drip and dry" can be repeated.

In this exemplary embodiment, disc base 40 is formed by dripping, which produces the advantages of an inexpensive cost, high accuracy and a reduced process time.

When the resin-made ink mixed with fine particles of silica is used, the surface of disc base 40 is not mirror finished but is roughened (having peaks and valleys on a microscopic scale). Because the ultraviolet curable resin is entirely contracted and hardened by ultraviolet ray; however, since silica has a given size, it floats from the resin surface even under the ultraviolet ray. The peaks and valleys are thus formed on the surface of disc base 40. Silica is employed in this process because it does not chemically react with other materials so that the characteristics of the resin do not change. Further, the silica having 1 nm–100 nm particle size is used so that accuracy of surface wobble-compensation is not adversely affected. The surface wobble is compensated on a micron order accuracy that is required to ordinal disc drive apparatuses. Other fine particles producing the same result can be substituted for silica.

The roughened surface of disc base 40 produces friction with the disc loaded on disc base 40, thereby preventing the disc from slipping. Further, since the adhesion between the disc and disc base 40 is imperfect, the disc can be removed from disc base 40 with ease and free from noises.

The noise generated in the disc driving apparatus is described hereinafter. Discs are made of resin, in general, thus the turntables made of resin are apt to absorb the disc, for the materials of both have similar structures, and the molecules on both surfaces absorb with each other when both of the disc and the turntable receive pressure. As a result, the turntable strongly absorbs the disc. The noises are thus produced when the disc is unloaded from disc base 40. When this turntable device is employed, among others, in a portable disc driving apparatus, the disc is come off from the turntable every time when the apparatus is vibrated due to user's carrying, thereby producing harsh noises.

The Japanese Patent Application Non-examined Publication No. H09-27166 discloses another prior art that a disc base is formed by applying paint of polyurethane system on a turntable. In this case, a disc adhered to the disc base made of the hardened polyurethane paint. Since the hardened polyurethane paint is still soft, the disc keeps adhering to the disc base even when the apparatus is hand-carried by a user. The disc follows the vibration so that little noise is generated; however, when the disc is unloaded from the disc base, noises are produced due to strong adhesion.

The disc base made of polyurethane paint is so soft that filler particles having 1 nm–100 nm sizes are absorbed into the base due to small particle sizes. Therefore, fine roughness cannot be formed on the surface of the disc base. The filler, thus, having particle size on a micron order is desirably used to roughen this surface. However, such large particle sizes are not good for a high density disc driving apparatus such as for DVD, because large size peak and valleys are formed on the base surface, which easily produces surface wobbles. For instance, the filler mixed into polyurethane paint has an average particle size of 1–35 $\mu$m, this particle size of the prior art does not fit to a DVD player which accepts the surface wobble not more than 30 $\mu$m.

The disc base made of photo-curable resin in accordance with the first exemplary embodiment has a hardness ranging from 60 to 75 according to JIS K 7215, "A"-hardening measurement method (hereinafter referred to as JISA.) This measurement method, Durometer Hardness Measuring Method of Plastics, is specified by the Japanese Industrial Standard (JIS) for determining hardness grades of rubber, plastic materials and the like.

When the disc base has such hardness as above, the absorption between the disc and the disc base is not so strong that the disc can be unloaded from the base with ease. However, when this disc base is employed in a portable apparatus, the disc does not follow the vibration because the adhesion is not enough. Therefore, the vibration of the apparatus entails noises between the disc and the disc base.

The drawbacks of the prior art are overcome by the present invention embodied in the first exemplary embodiment. Fine particles having 1 nm–100 nm sizes are mixed with the photo-curable resin, thereby roughening the surface of the disc base having the hardness of JISA 60–75. As a result, little noises are produced between the disc and the disc base, and the disc is prevented from slipping. Since the particle size is as fine as 1 nm–100 nm, the surface-wobble-compensation is free from adverse influence.

The hardness of the disc base is not limited within the range of JISA 60 to 70, but the same effect can be expected if the hardness is not less than 60. The fine particles are preferably mixed with the resin in 3–5% volume.

Exemplary Embodiment 2

Figure 4:
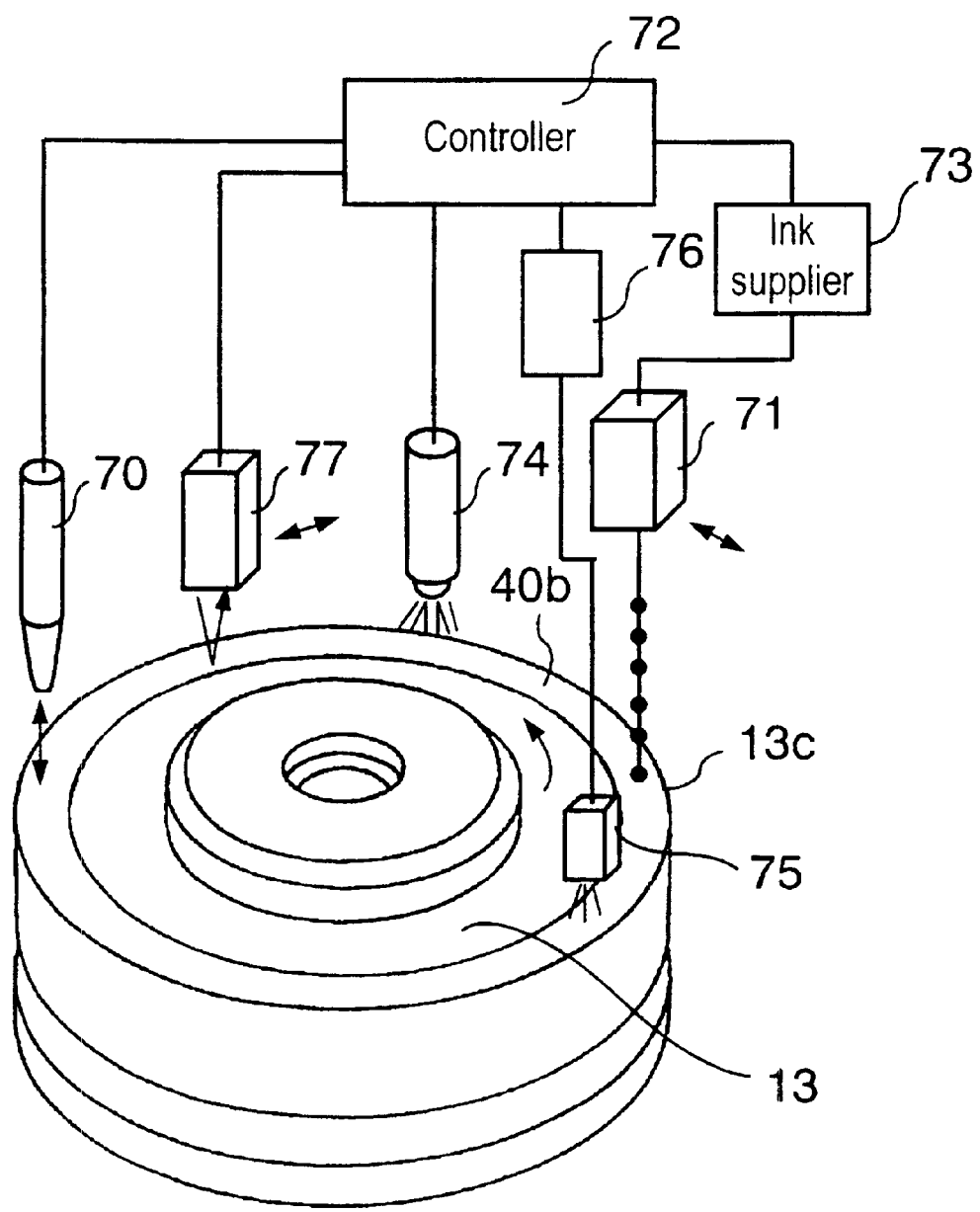
FIG. 4 illustrates another manufacturing method of a disc base of the turntable device in accordance with an exemplary embodiment of the present invention.

FIG. 4 illustrates another manufacturing method of the disc base of the present invention.

The film-forming-device in accordance with the second exemplary embodiment comprises (a) photo-sensor 70 for measuring an amount of surface wobble, (b) controller 72, (c) marking ink supplier 76, (d) marking ink application nozzle 75, (e) image recognition sensor 77, (f) ink supplier 73, (g) inkjet nozzle 71 and (h) ultraviolet lamp 74. Controller 72 is coupled to these elements.

Inkjet nozzle 71 and image recognition sensor 77 can move along circumference 13c as shown with arrow marks in FIG. 4.

Some of the elements are arranged in the same manner as the first exemplary embodiment. Photo-sensor 70 is disposed facing circumference 13c with a given distance, and measures a change in the distance in between. When the turntable is spun, controller 72 including a microcomputer takes in the measurement result by sensor 70 at given sampling intervals, and calculates an amount of surface wobble at each rotational position, then determines a desirable flat plane based on the calculation result.

Marking ink supplier 76 supplies marking ink in a given quantity to marking ink application nozzle 75 according to an ink-supply-signal provided by controller 72 based on the determined desirable flat plane. Application nozzle 75 thus forms a shading pattern (dense and sparse) on circumference 13c responsive to the distances to the determined desirable flat plane. Sensor 77 recognizes the shading pattern and sends the result to controller 72, which then transmits a signal that controls a number of drips to ink supplier 73 based on the recognition result. Then, inkjet nozzle 71 forms films on circumference 13c with respective thickness according to the shading pattern, i.e. the distances to the desired flat plane.

The disc base of turntable device in accordance with the second exemplary embodiment of the present invention is manufactured by the following steps:

(a) Dispose the turntable device at a given place in the film-forming device, and spin the motor;

(b) Photo-sensor 70 measures the surface wobble of circumference 13c along the turntable.

(c) Controller 72 calculates each amount of surface wobbles at each rotational position based on the measurement results by sensor 70.

(d) Controller 72 sends respective recognition signals responsive to the distances between the determined plane and the circumference 13c to marking ink supplier 76.

(e) Marking ink supplier 76 supplies the marking ink to the application nozzle 75 based on the recognition signals.

(f) Application nozzle 75 forms the shading pattern on circumference 13c by applying the marking ink.

(g) Halt the motor, and move recognition sensor 77 along above circumference 13c.

(h) Controller 72 recognizes the shading pattern.

(i) Controller 72 provides a control signal to ink supplier 73, the control signal controls a number of drips responsive to the shading pattern (dense and sparse).

(j) Move inkjet nozzle 71 along above circumference 13c and form films on circumference 13c. The films has respective thickness according to the shading pattern (dense and sparse), i.e. distance to the determined flat plane.

(k) Finally, drive the motor again to irradiate ultraviolet ray from lamp 74 to the films, and harden and dry the films so that the disc base is formed on circumference 13c.

Instead of moving sensor 77 and nozzle 71, turntable 13 can be rotated when images are recognized and the films are formed,.

In this exemplary embodiment, the ink is dripped when the motor is halted. Therefore, the ink hardly splashes out of circumference 13c comparing with the case where the motor is driven at the dripping. As a result, the films can be formed with more accuracy.

Instead of the photo-curable resin, heat-curable resin including acrylic resin can be used. In this case, a light source can be replaced with a heater.

Exemplary Embodiment 3

A sattin finished sheet, ground glass and flexible film are used for roughening a surface of a disc base in accordance with the third exemplary embodiment.

A manufacturing method of a turntable of the third exemplary embodiment comprises the steps of:

(a) Dispose a turntable device at a given place in a film-forming-device, and then drive a motor.

(b) Calculate an amount of surface wobble, and drip ultraviolet curable resin onto a circumference of the turntable to form disc base 40. The drip quantity is determined responsive to the amount of surface wobble.

(c) Harden the ultraviolet curable resin in a half way, and stick a sheet of ground glass onto the surface of the disc base.

(d) Irradiate ultraviolet ray to the disc base that is stuck by the ground glass in order to harden the resin, whereby the surface of the disc base is roughened.

Instead of sticking the ground glass on the base surface, a printing technique can roughen the surface. For instance, PAD printing method can transfer peaks and valleys on the surface, or the screen printing method can provide the surface with peaks and valleys.

Exemplary Embodiment 4

Fine blocks are disposed on a hardened surface of a disc base in order to roughen the surface.

A manufacturing method of a turntable of the fourth exemplary embodiment comprises the steps of:

(a) Dispose a turntable device at a given place in a film-forming-device, and then drive a motor.

(b) Calculate an amount of surface wobble, and drip ultraviolet curable resin to circumference of the turntable to form disc base. The drip quantity is determined responsive to the amount of surface wobble.

(c) Heat the fine blocks to a high temperature, and powder the fine blocks on the base surface.

The surface of the disc base is thus roughened.

Exemplary Embodiment 5

A hardened surface of a disc base is cut to provide roughness on the surface following the steps below:

(a) Dispose a turntable device at a given place in a film-forming-device, and then drive a motor.

(b) Calculate an amount of surface wobble, and drip ultraviolet curable resin to a circumference of the turntable to form disc base. The drip quantity is determined responsive to the amount of surface wobble.

(c) Irradiate ultraviolet ray so that the resin is hardened.

(d) Irradiate laser beam such as excimer laser, or $CO_2$ laser, onto the hardened resin to roughen the surface.

The surface of the disc base is thus roughened.

Instead of being irradiated with laser beam, the surface can be cut with a bite into rough surface.

Exemplary Embodiment 6

Figure 5:
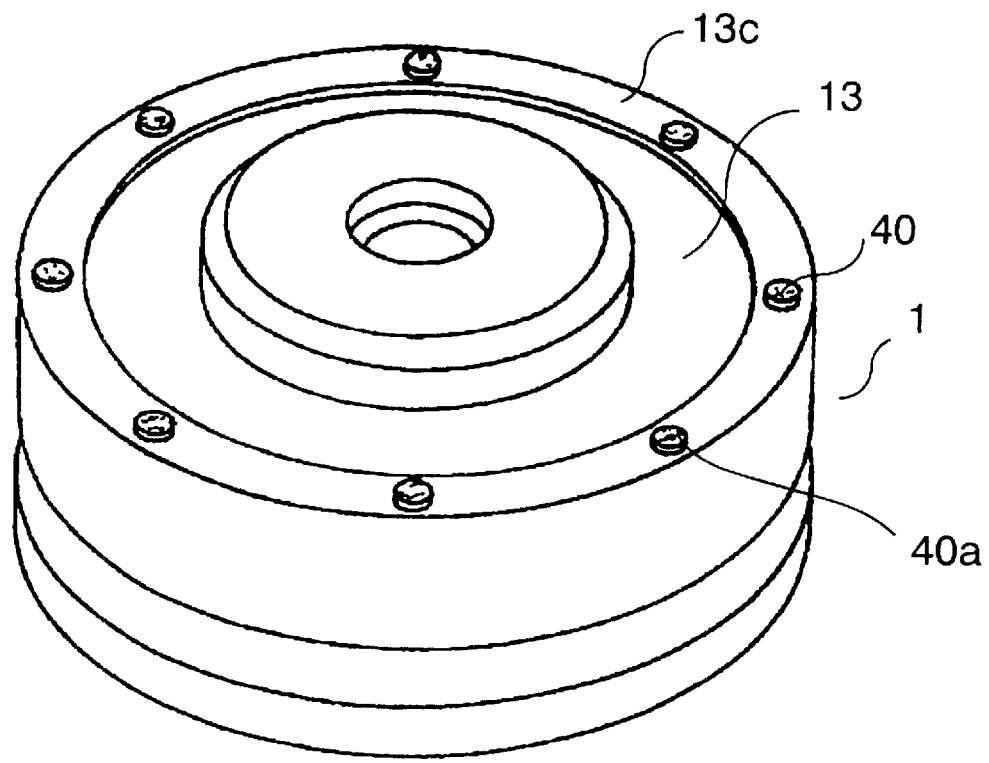
FIG. 5 is a perspective view of another turntable device in accordance with an exemplary embodiment of the present invention.
Figure 6:
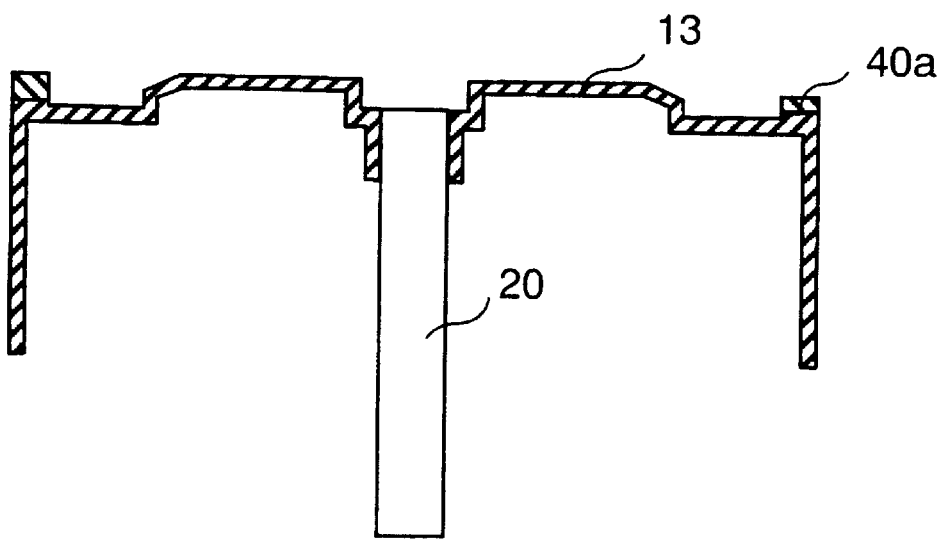
FIG. 6 is a cross section of the turntable shown in FIG. 5.

FIG. 5 is a perspective view of another turntable of the present invention in accordance with the sixth exemplary embodiment. FIG. 6 is a cross section of the turntable shown in FIG. 5.

As shown in FIG. 5, disc bases 40a are disposed on the circumference of turntable 13 with a space in between. In other words, heights of each disc base are determined responsive to each amount of surface wobble at respective bases, whereby each amount of surface wobble can be compensated at the respective bases. Disc bases 40a are desirably formed at more than three places on circumference 13c of turntable 13.

FIG. 6 details how to compensate the surface wobble.

Turntable 13 is press fitted with a slight angle toward left with regard to rotary shaft 20, whereby surface wobble is produced on turntable 13. However, in this exemplary embodiment, disc bases 40a at the right-hand side and the left-hand side on turntable 13 in FIG. 6 are formed in different heights responsive to the surface-wobble-amounts at the respective places. Therefore, if the turntable 13 is wobbled, the wobble on disc bases 40a can be compensated. As a result, the surface wobble of the disc loaded on disc bases 40a can be reduced.

As such, departing from pursuing an ultimate accuracy of component process or that of assembling the components, a turntable device having little surface wobble can be achieved by the present invention. For instance, in the conventional turntable device, if the surface wobble amount is required to be not more than 20 $\mu$m, processing accuracy of each component and assembling accuracy of the components should be as fine as not more than 2–5 $\mu$m. In this exemplary embodiment, the components can be processed and assembled with accuracy of 20–30 $\mu$m, which reduces the manufacturing cost of the components as well as the assembly cost of the turntable device.

When fine particles are mixed into the disc bases, the wobble cannot be compensated if a particle size is over 1 $\mu$m. The particle size of 1 nm–100 nm is thus desirable.

Exemplary embodiment 7

Figure 7:
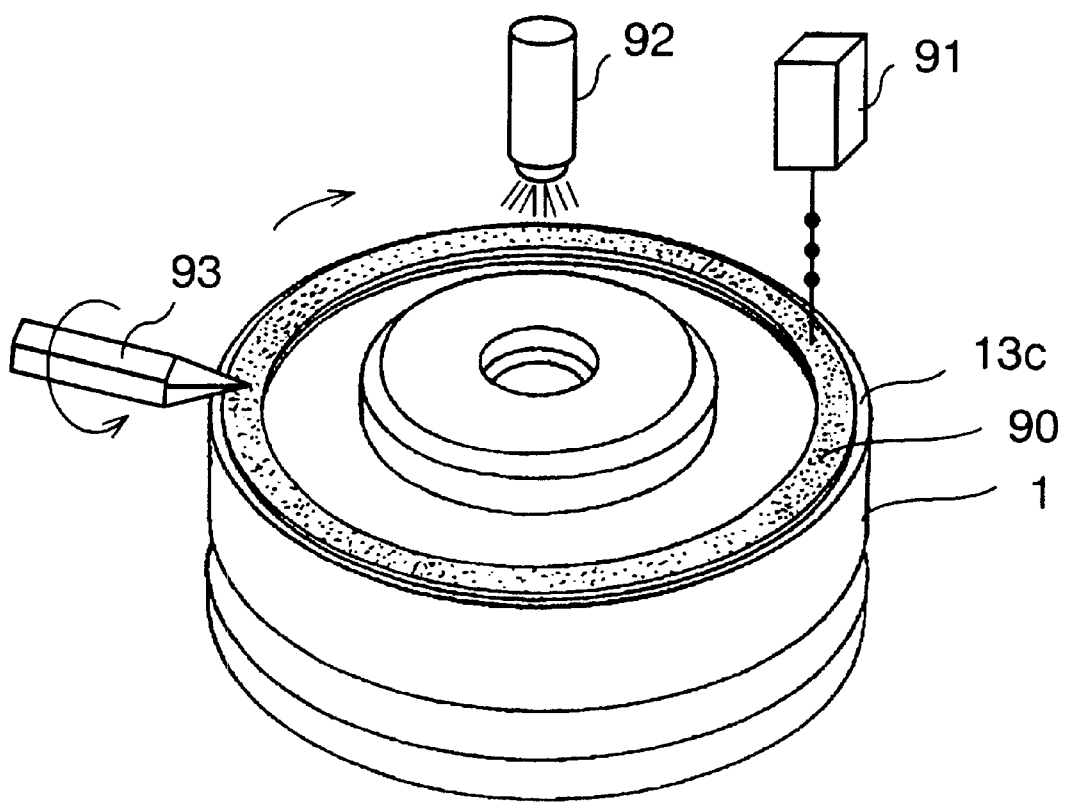
FIG. 7 illustrates a shaving step of the disc base in accordance with an exemplary embodiment of the present invention.
Figure 8:
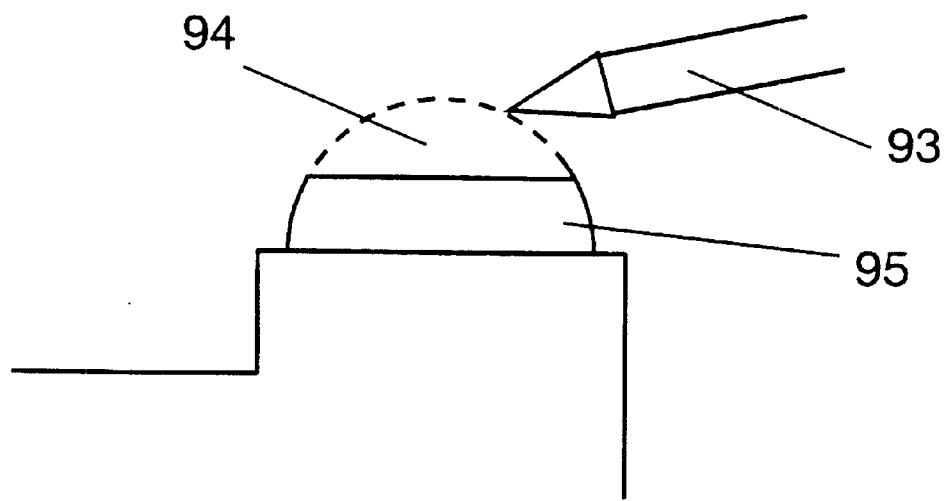
FIG. 8 is an enlarged view of an essential part of the shaving step shown in FIG. 7.
Figure 9:
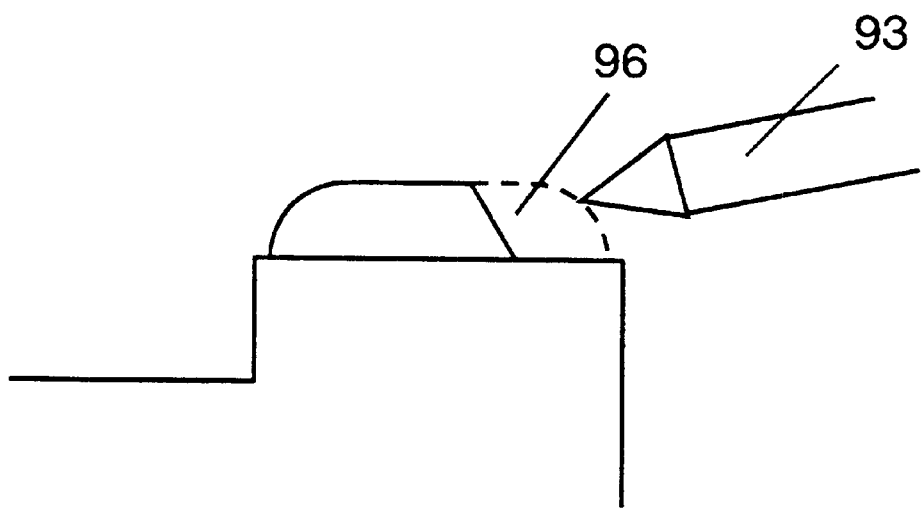
FIG. 9 is an enlarged view of an essential part illustrating another shaving step after the shaving shown in FIG. 8.

FIGS. 7, 8 and 9 illustrate shaving steps of a disc base on a turntable in accordance with the seventh exemplary embodiment of the present invention.

A manufacturing method of a disc base 90 is described hereinafter, where ultraviolet curable resin is used.

(a) Dispose a turntable device at a given place in a film-forming-device, and then drive a motor.
(b) Supply a given amount of acrylic resin of ultraviolet curable type to dispenser 91. Drip the acrylic resin from dispenser 91 to form a ring-shaped disc base 90 or multi-spots type disc bases 90 on circumference 13c so that the height of disc base(s) 90 is 0.3–0.5 mm.
(c) Irradiate ultraviolet ray to disc base(s) 90 by ultraviolet lamp 92 to harden and dry the resin.
(d) Shave and process disc base(s) 90 in order to build more accuracy in a turntable.

The shave and process are detailed below:

First, integrate a turntable device into a disc driving apparatus.

Second, form disc base(s) 90 following the method discussed above, thereby determining a height of disc base surface from a bottom of the disc driving apparatus.

Then, determine a position of end-mill 93, and spin the shaft of end-mill 93 at the same time when rotating the turntable to shave the disc-base-surface so that the height of the surface is accurately adjusted.

If elastic ultraviolet curable resin is selected as a material of disc base(s) 90, not only the surface wobble is avoided but also the disc is prevented from slipping on the turntable. The drip of the resin preferably reaches to not less than 0.3 mm height in order to compensate the surface wobble; however, if the drip builds itself into a thick base, it requires large amount of energy of ultraviolet ray and it takes a long time for hardening. Further, the resin might flow over the edge of turntable due to centrifugal force. The maximum desirable height to prevent the possible problems discussed above is thus ca. 0.5 mm.

When heat curable resin, thermoplastic resin, or rubber is selected as the material, instead of directly dripped onto the turntable, the material can be molded and hardened into a given shape. Then, the resultant material is integrated into the turntable device. The heat curable resin includes epoxy resin, phenol resin, unsaturated polyester resin and the compound material that contains those resins. The thermoplastic resin includes polycarbonate resin, polyamide resin, saturated polyester resin, polyphenylene oxide resin, polyethylene resin, polypropylene resin, polystyrene resin, ABS resin, AS resin and other thermoplastic resins. Molding material containing these resins with filler such as glass fiber, etc. can be also used. The rubber includes urethane rubber, natural rubber, NBR, CR in general. Fluororubber and silicone rubber can be also used.

As discussed in this embodiment, when the resin-made disc base is formed on the metallic turntable, the resin firmly sticks to the turntable. Therefore, there is little chance for the disc base to come off the turntable during the cut and process of the disc base.

FIG. 9 illustrates the re-cutting method.

This method is effective when greater friction is produced between the disc and the disc base. After the cut and process shown in FIGS. 7 and 8, the disc base is shaved again slantwise. For this purpose, rotate the turntable and contact end-mill 93 to the disc base so that a part 96 of the disc base is shaved.

Figure 10:
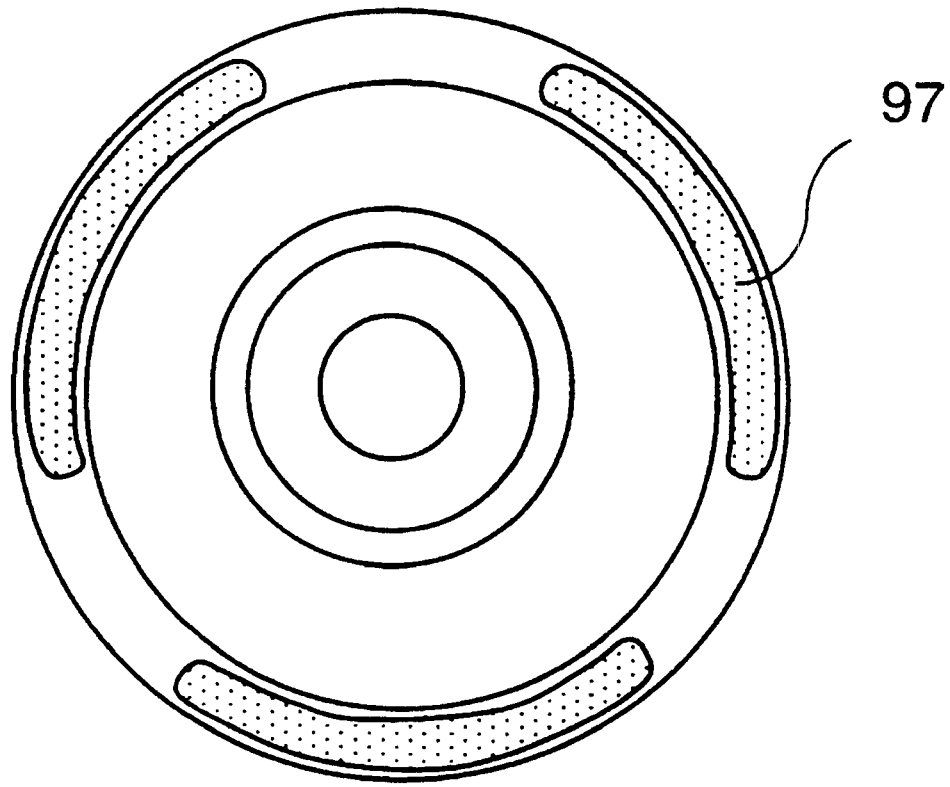
FIG. 10 is a plan view of a turntable of which disc bases are cut radially by the machining step in accordance with the exemplary embodiment of the present invention.

FIG. 10 is a plan view of a turntable of which disc base is radially formed by a cutting method in accordance with this exemplary embodiment of the present invention.

In FIG. 10, disc base 97 is divided radially into three sections by cutting, and each of them is arc-shaped. This method allows the disc base to adjust contact area and friction with a disc. Aligning the rotating directions of the turntable and the end-mill in cutting would reduce pressure to the cut face so that the more accurate finish can be expected. Fine particles are mixed with the ultraviolet curable resin when the disc bases 97 are formed so that the surface of the disc base can be roughened. A sattin finished sheet can be also used to roughen the surface. This roughness prevents the disc from adhering to disc base 97.

In the embodiment discussed above, the turntable on which the disc base has been formed is integrated into the disc driving apparatus, then the disc base made of hardened ultraviolet curable resin is cut. However, the turntable device can be firstly integrated into the disc driving apparatus, then the ultraviolet resin can be dripped and hardened on the circumference 13c of the turntable. After that, the surface of the disc base can be shaved by end-mill 93 to adjust the height thereof.

As such, the height of the disc base of the disc driving apparatus is adjusted to compensate the surface wobble of the disc base. The disc driving apparatus thus can drive a disc with extremely little surface-wobble.

When the disc base is cut and processed, it is not necessarily to mix fine particles to the resin forming the disc base for roughening the surface. In other words, the disc base can be cut and shaved so that the contact area between a disc and the disc base can be adjusted, and appropriate friction can be provided on the contact area.

The turntable device incorporating the turntable of the present invention can be mounted to various disc driving apparatuses such as CD players, LD players, DVD players, MD players, CD-ROM driver, CD-RAM driver, DVD-ROM driver, DVD-RAM driver, MO disc driver and PD disc driver. The advantages of the present invention, such as extremely little surface wobble of a disc and unload of the disc in a smooth manner with little noises, benefit these apparatuses. These benefits are greatly appreciated in this industry. According to the manufacturing method of the present invention, departing from pursuing an ultimate accuracy of component process or that of assembling the components, a turntable device having extremely little surface-wobble can be achieved. The manufacturing method also can reduce the manufacturing cost of the components as well as the assembling cost of the turntable device.

These exemplary embodiments described above are the explanatory purposes and not intended to limit the invention. Various modifications can be available without departing from the scope of the invention.

Industrial Applicability

The turntable device and the manufacturing method thereof can provide an excellent disc driving apparatus where a disc loaded on a disc base of the turntable is free from slipping and adhesion, and the surface wobble of the disc base can be well compensated.

What is claimed is:

1. A turntable device comprising:
   (a) a bracket;
   (b) a bearing secured in said bracket;
   (c) a rotary shaft journaled by said bearing;
   (d) a rotor secured to said rotary shaft;
   (e) a stator facing said rotor and mounted to said bracket;
   (f) a turntable secured on said rotor; and
   (g) a disc base comprising resin with a hardness more than a predetermined level and not less than 60 in terms of hardness "A" specified by JIS K 7215, said disc base disposed on said turntable for receiving a disc, and said disc base having a predetermined roughness on a surface thereof.

2. The turntable as defined in claim 1 wherein said turntable is a top plate of a rotor frame of said rotor.

3. The turntable as defined in claim 1 wherein the roughness of the surface of said disc base ranges from 1 nm to 100 nm.

4. The turntable as defined in claim 1 wherein a fine particle is mixed in said disc base.

5. The turntable as defined in claim 4 wherein a size of the fine particle is 1 nm–100 nm.

6. The turntable as defined in claim 4 wherein the fine particle is silica.

7. The turntable as defined in claim 1 wherein said turntable is made of metal.

8. A method of manufacturing a turntable device, wherein said turntable device comprising:

(a) a bracket;
(b) a bearing secured in said bracket;
(c) a rotary shaft journaled by said bearing;
(d) a rotor secured to said rotary shaft;
(e) a stator facing said rotor and mounted to said bracket;
(f) a turntable secured on said rotor; and
(g) a disc base comprising resin with a hardness more than a predetermined level, said disc base disposed on said turntable for receiving a disc, and said disc base having a predetermined roughness on a surface thereof, said method comprising the step of:
 forming a disc base by:
  a first step of dripping liquid resin mixed with fine particles onto a turntable; and
  a second step of hardening the liquid resin.

9. The method of manufacturing the turntable device as defined in claim 8 wherein said first step comprising the steps of:

(a) disposing said turntable device before dripping the resin thereto at a predetermined place in a film-forming-device, and rotating said turntable;
(b) measuring amount of surface wobble on circumference of said turntable by a photo sensor of the film-forming-device;
(c) determining a desirable flat plane by a controller of the film-forming-device based on a measured result of surface wobble; and
(d) forming a film until a thickness thereof becomes a thickness of the desirable flat plane by supplying ultraviolet resin, said second step comprising the steps of: hardening the film by irradiating ultraviolet ray to said disc base.

10. The method of manufacturing the turntable device as defined in claim 8 wherein a hardness of the resin hardened from the liquid resin is not less than 60 in terms of hardness "A" specified by JIS K 7215.

11. The method of manufacturing the turntable device as defined in claim 8 wherein a size of the fine particle is 1 nm–100 nm.

12. The method of manufacturing the turntable device as defined in claim 8 wherein the fine particle is silica.

13. The method of manufacturing the turntable device as defined in claim 8 wherein the liquid resin contains the fine particle in 3–5% volume.

14. A method of manufacturing a turntable device, wherein said turntable device comprising:

(a) a bracket;
(b) a bearing secured in said bracket;
(c) a rotary shaft journaled by said bearing;
(d) a rotor secured to said rotary shaft;
(e) a stator facing said rotor and mounted to said bracket;
(f) a turntable secured on said rotor; and
(g) a disc base comprising resin with a hardness more than a predetermined level, said disc base disposed on said turntable for receiving a disc, and said disc base having a predetermined roughness on a surface thereof, said method comprising the step of:
 forming said disc base by:
  a first step of dripping liquid resin onto said turntable;
  a second step of half-hardening the dripped liquid resin; and
  a third step of roughening a half-hardened surface of resin.

15. The method of manufacturing the turntable device as defined in claim 14 wherein said third step comprising the steps of:

sticking a sattin finished sheet to the half-hardened surface of resin and hardening the surface; and then
roughening the surface by removing the sheet.

16. A method of manufacturing a turntable device, wherein said turntable device comprising:

(a) a bracket;
(b) a bearing secured in said bracket;
(c) a rotary shaft journaled by said bearing;
(d) a rotor secured to said rotary shaft;
(e) a stator facing said rotor and mounted to said bracket;
(f) a turntable secured on said rotor; and
(g) a disc base comprising resin with a hardness more than a predetermined level, said disc base disposed on said turntable for receiving a disc, and said disc base having a predetermined roughness on a surface thereof, said method comprising the step of:
 forming said disc base by:
  a first step of dripping liquid resin onto said turntable;
  a second step of hardening the dripped liquid resin; and
  a third step of roughening a hardened surface of the resin.

17. The method of manufacturing the turntable device as defined in claim 16 wherein said third step comprising the step of:

roughening the surface of the disc base by PAD printing.

18. The method of manufacturing the turntable device as defined in claim 16 wherein said third step comprising the step of:

roughening the surface of the disc base by screen printing.

19. The method of manufacturing the turntable device as defined in claim 16 wherein said third step comprising the step of:

roughening the surface of the disc base by cutting.

20. The method of manufacturing the turntable device as defined in claim 16 wherein said third step comprising the step of:

roughening the surface of the disc base by sticking a block.

21. The method of manufacturing the turntable device as defined in claim 16 wherein said third step comprising the step of:

roughening the surface of the disc base by irradiating laser beam to the surface of the disc base.

22. A method of manufacturing a turntable device, wherein said turntable device comprising:
(a) a bracket;
(b) a bearing secured in said bracket;
(c) a rotary shaft journaled by said bearing;
(d) a rotor secured to said rotary shaft;
(e) a stator facing said rotor and mounted to said bracket;
(f) a metallic turntable secured on said rotor; and
(g) a disc base comprising resin with a hardness more than a predetermined level, said disc base disposed on said turntable for receiving a disc, and said disc base having a predetermined roughness on a surface thereof,
said method comprising the step of:
forming said disc base by:
a first step of dripping liquid resin onto said turntable;
a second step of hardening the dripped liquid resin; and
a third step of shaving a hardened surface of the resin.

23. The method of manufacturing the turntable device as defined in claim 22 wherein said third step comprising the step of:
shaving the surface with rotating said turntable.

24. The method of manufacturing the turntable device as defined in claim 22 wherein said third step comprising the step of:
shaving the surface to form not less than three said disc bases in a divided manner.

25. A method of manufacturing a turntable device, wherein said turntable device comprising:
(a) a bracket;
(b) a bearing secured in said bracket;
(c) a rotary shaft journaled by said bearing;
(d) a rotor secured to said rotary shaft;
(e) a stator facing said rotor and mounted to said bracket;
(f) a turntable secured on said rotor; and
(g) a disc base comprising resin with a hardness more than a predetermined level, said disc base disposed on said turntable for receiving a disc, and said disc base having a predetermined roughness on a surface thereof,
said method comprising the step of:
forming said disc base by:
after mounting said turntable device to a disc driving apparatus;
a first step of dripping liquid resin mixed with fine particles onto said turntable; and
a second step of hardening the dripped liquid resin.

26. A method of manufacturing a turntable device, wherein said turntable device comprising:
(a) a bracket;
(b) a bearing secured in said bracket;
(c) a rotary shaft journaled by said bearing;
(d) a rotor secured to said rotary shaft;
(e) a stator facing said rotor and mounted to said bracket;
(f) a metallic turntable secured on said rotor; and
(g) a disc base comprising resin with a hardness more than a predetermined level, said disc base disposed on said turntable for receiving a disc,
said method comprising the step of:
forming said disc base by:
after mounting said turntable device to a disc driving apparatus;
a first step of dripping liquid resin onto said turntable;
a second step of hardening the dripped liquid resin; and
a third step of shaving a hardened surface of the resin.

27. A method of manufacturing a turntable device, wherein said turntable device comprising:
(a) a bracket;
(b) a bearing secured in said bracket;
(c) a rotary shaft journaled by said bearing;
(d) a rotor secured to said rotary shaft;
(e) a stator facing said rotor and mounted to said bracket;
(f) a metallic turntable secured on said rotor; and
(g) a disc base comprising resin with a hardness more than a predetermined level, said disc base disposed on said turntable for receiving a disc,
said method comprising the step of:
forming said disc base by:
a first step of dripping liquid resin onto said turntable;
a second step of hardening the dripped liquid resin; and after mounting said turntable device to a disc driving apparatus,
a third step of shaving a hardened surface of the resin.

28. A turntable device comprising:
(a) a bracket;
(b) a bearing secured in said bracket;
(c) a rotary shaft journaled by said bearing;
(d) a rotor secured to said rotary shaft;
(e) a stator facing said rotor and mounted to said bracket;
(f) a turntable secured on said rotor; and
(g) a disc base comprising a photocurable resin with a hardness more than a predetermined level, said disc base disposed on said turntable for receiving a disc, and said disc base having a predetermined roughness on a surface thereof.

* * * * *